United States Patent [19]

Soma et al.

[11] Patent Number: 4,881,065
[45] Date of Patent: Nov. 14, 1989

[54] X-Y POSITION INPUT APPARATUS INCLUDING PREVENTING DUST INTERFERENCE

[75] Inventors: Masahiro Soma, Furukawa; Shinya Tanaka, Yakohama, both of Japan

[73] Assignee: Alps Electric Co., Ltd., Japan

[21] Appl. No.: 139,906

[22] Filed: Dec. 31, 1987

[30] Foreign Application Priority Data

Apr. 28, 1987 [JP] Japan .............................. 62-63433[U]

[51] Int. Cl.$^4$ ............................................. G09G 1/00
[52] U.S. Cl. ..................................... 340/710; 340/706; 178/18; 74/471 XY
[58] Field of Search ............... 340/710, 706, 709, 711; 74/471 XY, 198; 178/18

[56] References Cited

U.S. PATENT DOCUMENTS

| | | | |
|---|---|---|---|
| Re. 32,633 | 3/1988 | Hovey et al. | 340/710 |
| 3,541,521 | 11/1970 | Koster | 340/710 |
| 3,613,090 | 10/1971 | Mason | 340/710 |
| 3,835,464 | 9/1974 | Rider | 340/710 |
| 3,987,685 | 10/1976 | Opocensky | 340/710 |
| 4,404,865 | 7/1983 | Kim | 340/710 |
| 4,594,586 | 6/1986 | Hosogoe | 340/710 |
| 4,628,755 | 12/1986 | Hawley | 340/710 |

*Primary Examiner*—Gerald Brigance
*Attorney, Agent, or Firm*—Guy W. Shoup; Paul J. Winters

[57] ABSTRACT

An X-Y input apparatus is suitable for a graphic display apparatus and a pattern input apparatus. The X-Y input apparatus includes a rotatable ball, first and second rotating shafts provided in contact with the rotatable ball and orthogonally arranged in an X-Y direction, and a rotatable-angle detector. A stepped-portion is formed on each portion of the first and second rotating members, adjacent to the contacting portion for the rotatable ball. Then, the contamination such as dust is transferred from the rotatable roller to the grooves formed on the first and second rotating members, but is not deposited on the stepped-portion.

6 Claims, 5 Drawing Sheets

X-Y POSITION INPUT APPARATUS INCLUDING PREVENTING DUST INTERFERENCE

BACKGROUND OF THE INVENTION

1. Field of the Invention

The present invention relates to an X-Y input apparatus, and more particularly to an X-Y input apparatus suitable for use as a graphics input device associated with a graphic display apparatus.

2. Description of the Related Art

Graphic display apparatus are basically composed of a display screen, a display controller, a data channel, and an input device which may be in various forms. One known input device is a "joystic" (registered trademark) having a lever supported by a gimbal mechanism and tiltable by the operator in any direction of a plane. Detection is made of the direction and angle of tilt of the lever and then voltages or digital signals indicative of coordinate values in X and Y directions. This type of input device is disadvantageous however in that the range of angular movement of the lever is limited and input signals entered by the operator are relatively unstable.

In an effort to eliminate the above drawbacks, there has been developed an input apparatus called as a "mouse". One type of the mouse has a rotatable member such as a steel ball (hereinafter simply referred to as a "ball"), a first driven roller member held in contact with the ball and rotatable in response to rotation thereof, and a second driven foller member held in contact with the ball and rotatable in response to rotation thereof. The first and second rollers have their axes of rotation extending substantially perpendicularly to each other. The mouse also includes first and second angle detector means composed of variable resistors or encoders for separately detecting angles of rotation of the first and second driven roller members. The ball, first and second driven roller members, and first and second angle detector means are all housed in a casing.

The casing has an opening defined in its bottom with the ball partly projecting through the opening. In use, the casing is held by the operator to place the ball against a given base. By moving the case to cause the ball to roll on the surface in any arbitrary direction, the first and second driven roller members are rotated in their predetermined directions. The directions and angles of rotation of the driven roller members are converted by the first and second angle detector means into voltages or digital signals representative of coordinate values in X and Y directions. The generated signals are then entered into a display apparatus. The mouse is arranged in the above-described system.

In the conventional X-Y input apparatus, as previously described in detail, the opening is formed on the lower surface of the casing. The ball partially projects via this opening toward the lower direction. Then, the ball is rotated on the base while the casing is held by the operator, and the amount of the rotations of the ball is detected so as to input the data signals in the coordinate system. If contamination such as dust remains on the base, this contamination is attached to the ball, and then transported to the driven roller members in accordance with the rotating operations of the ball. In this case, if the touching planes of the driven roller members with the ball are formed in parallel with thier rotating axes, the contamination which has been transported to the driven roller members is deposited thereon, resulting in deterioration of detecting precision. This is because the surface of the ball is covered with an elastic material, so that the surface of the ball is slightly deformed to enlarge the contact area thereof which is in contact with the driven roller members while rotating the ball.

SUMMARY OF THE INVENTION

The present invention has been accomplished in an attempt to solve the drawbacks mentioned above, and has an object to provide an X-Y input apparatus capable of depositing less contamination on the driven roller members, and also of preventing deterioration of detecting precision.

The above and other objects of the invention are realized, employing an X-Y input apparatus comprising:

a ball freely rotatably arranged;

a first rotating member rotated by a rotating force caused by being in contact with said rotatable ball;

a second rotating member arranged in a direction substantially perpendicular to a rotating axis direction of said first rotating member, and rotated by a rotating force caused by being in contact with said rotatable ball;

first rotation-angle detecting means for detecting a rotation angle of said first rotating member;

second rotation-angle detecting means for detecting a rotation angle of said second rotating member;

a casing for storing said rotatable ball, first and second rotating members, and first and second rotation-angle detecting means therein; and, a stepped-portion formed adjacent to portions of said first and second rotating members in their circle directions, which are in contact with said rotatable ball, whereby said rotatable ball partially projects from an opening formed on a lower plane of said rotatable ball on a base, resulting in performing X-Y input operation.

BRIEF DESCRIPTION OF THE DRAWINGS

The above and other objects, features and advantages of the present invention will become more apparent from the following description when taken in conjunction with the accompanying drawings in which preferred embodiments of the present invention are shown by way of illustrative example.

According to the X-Y input apparatus of the invention, the contamination such as dust deposited on the roller members is transported to the bottom direction of the stepped portion, and therefore, no longer remains at the portion contacted with the surface of the roller. As a consequence, no contamination is maintained on both the roller members and the surface of the ball, which can cause the precise X-Y detections to be realized.

DETAILED DESCRIPTION OF THE PREFERRED EMBODIMENT

The following all drawings are used for explaining an X-Y input apparatus according to one preferred embodiment of the invention.

Figure 2:
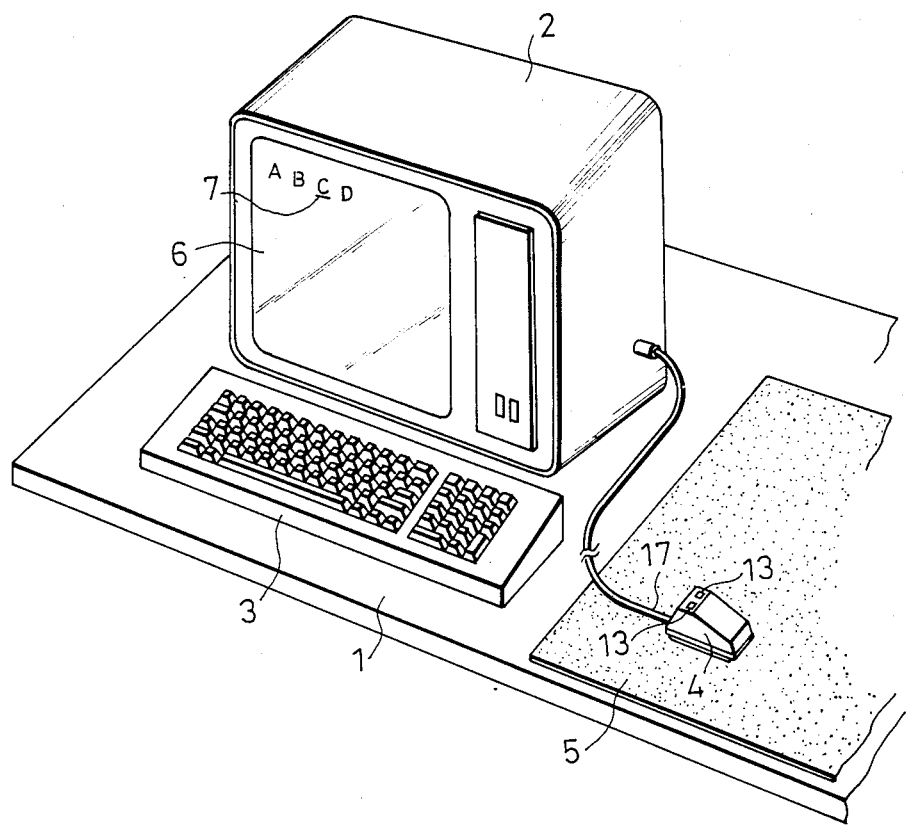
FIG. 2 is a perspective view of a graphic display apparatus including an X-Y input apparatus.
Figure 3:
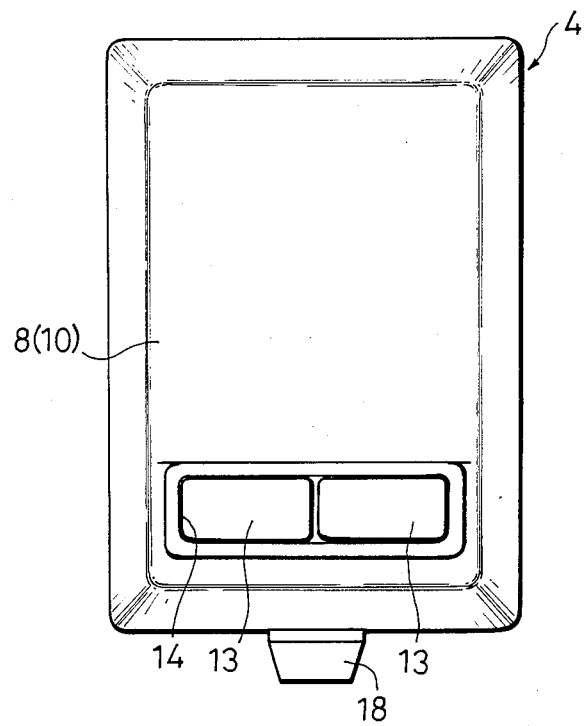
FIG. 3 is a plan view of the X-Y input apparatus.
Figure 4:
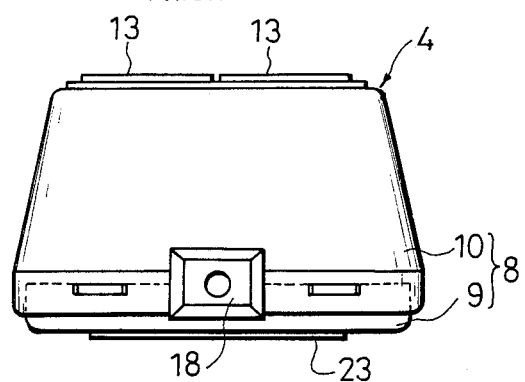
FIG. 4 is a front elevational view of the X-Y input apparatus.
Figure 5:
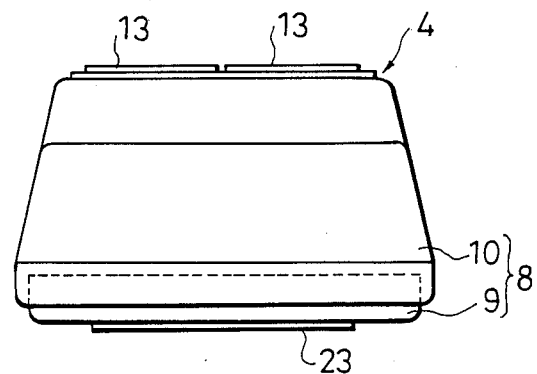
FIG. 5 is a rear elevational view of the X-Y input apparatus.
Figure 6:
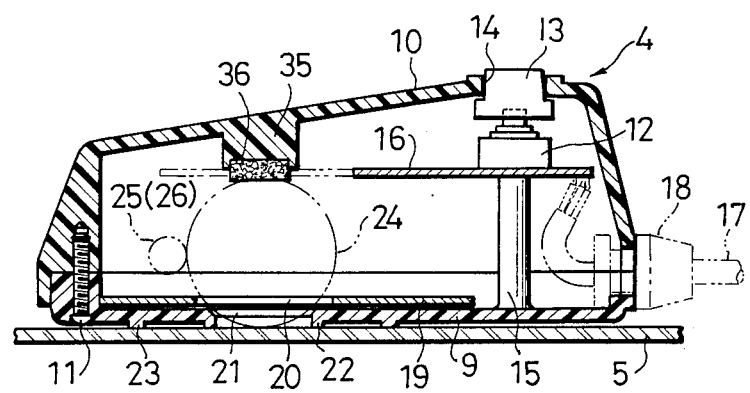
FIG. 6 is a cross-sectional view of the X-Y input apparatus.
Figure 7:
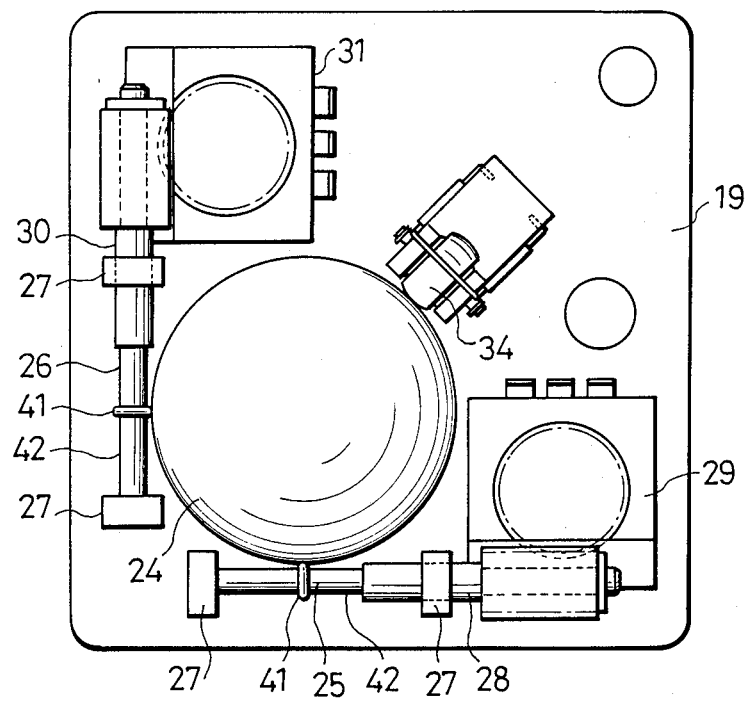
FIG. 7 is an enlarged plan view of the operation section of the X-Y input apparatus; and, FIG. 8 is an illustration for a basic idea of the operation section.
Figure 8:
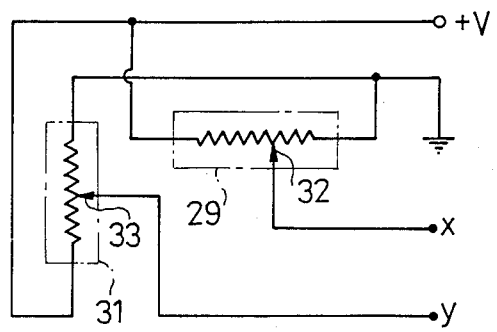

FIGS. 1a to 1d are side views of following shafts according to the invention;

FIG. 2 is a perspective view of a graphic display apparatus including an X-Y input apparatus;

FIG. 3 is a plan view of the X-Y input apparatus;

FIG. 4 is a front elevational view of the X-Y input apparatus;

FIG. 5 is a rear elevational view of the X-Y input apparatus;

FIG. 6 is a cross-sectional view of the X-Y input apparatus;

FIG. 7 is an enlarged plan view of the operation section of the X-Y input apparatus; and, FIG. 8 is an illustration for a basic idea of the operation section.

The graphic display apparatus illustrated in FIG. 2 comprises a display unit 2 mounted on a table 1 and having a screen, a controller, and a data channel, an input device 3 having function keys, and an X-Y input apparatus 4 according to the preferred embodiment of the present invention. The X-Y input device 4 is operated by an operator on a specific sheet 5 placed on the table 1 to move a cursor 7 to any desired position on a screen 6 of the display unit 2.

The X-Y input apparatus 4 has a casing 8 composed of a lower case 9 and an upper case 10, and the lower and upper cases 9 and 10 are made of synthetic resin. These cases 9 and 10 are jointed by means of screws provided at several portions thereon, as illustrated in FIG. 6. An inserting hole 14 is formed on a predetermined portion of the upper case 10, as shown in FIGS. 3 and 6, into which an actuator 13 of a switch 12 is inserted. It should be noted that although two inserting holes 14 are formed on the upper case 10, the number of the inserting hole may be increased depending upon the control system of the X-Y input apparatus to be employed.

As is shown in FIG. 6, a plurality of posts 15 project integrally from an inside of the lower case 9, and a printed-circuit board 16 having a prescribed conducting pattern (not shown) is fixed by screws, or other appropriate means to upper ends of the posts 15. Between the upper and lower cases 9 and 10, a rubber bushing 18 is sandwiched so as to conduct a signal line 17 inside the casing 8. On the above-described printed-circuit board 16, a switch 12, the signal line 17, and each terminal of two resistors 29 and 31 (will be discussed later) are connected.

An attachment plate 19 made of a metal is fastened by screws to the inside of the lower case 9. This attachment plate 19 is connected to the lower case 9, which serves as a reinforcement for the lower case 9. As shown in FIG. 6, a circular through hole 20 is formed on a predetermined position of the attachment plate 19, and a circular opening 21 having a slightly smaller diameter than that of the through hole 20 is formed at the position opposite to the through hole 20 of the lower case 9.

A first annular ridge 22 projects integrally from the lower case 9 to a lower opening edge of the opening 21 at the lower case 9, and a second annular ridge 23 coaxially, integrally formed with the lower case 9 and radially positioned outwardly from the first annular ridge 22.

A steel ball 24 is rotatably positioned upper the above through hole 20 and the opening 21. A part of the steel ball 24 slightly projects from the first ridge 22 via the through hole 20 and the opening 21. As is shown in FIG. 7, both a first followable shaft 25 as a first rotating member and a second followable shaft 26 as a second rotating member are contacted with a spherical surface of the ball 24. To the above-described attachment plate 19, both of the followable shafts 25 and 26 are rotatably attached, so that their axial directions of the first and second followable shafts 25 and 26 are so arranged as to be crossed at a right angle with each other. Both the followable shafts 25 and 26 are independently rotated by means of the rotating force of the steel ball 24. Both the rotating direction and rotating angle of the first followable shaft 25 are detected by a first variable resistor 29, as first rotation-angle detecting means, which is connected thereto via a rotating shaft 28. Similarly, the rotating direction and rotating angle of the second followable shaft 26 are detected by a second variable resistor 31, as second rotation-angle detecting means, which is connected thereto via a rotating shaft 30. In other words, variations in the rotating direction and rotating angle of the first followable shaft 25, as illustrated in FIG. 7, appear as the sliding direction and the transportation amount of the slider 32 in the first variable resistor 29. Similarly, changes in both the rotating direction and rotating angle of the second followable shaft 26 are represented as the sliding direction and the transportation amount of the slider 33 in the second variable resistor 31. As a result, the rotating conditions of the steel ball 24 can be detected as the X-axis direction component and Y-axis direction component, by means of voltage values derived from the first and second variable resistors 29 and 31.

Figure 1A:
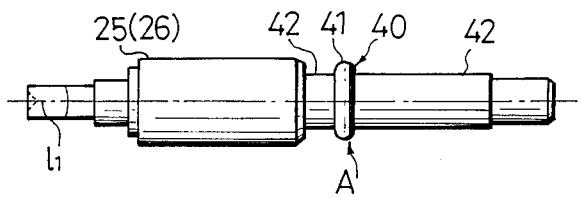
FIGS. 1a to 1d are side views of following shafts according to the invention.

On the first and second followable shafts 25 and 26, a stepped portion 40 is formed, as illustrated in FIG. 1a, adjacent to a contact portion "A" including a portion "A" which is in contact with the ball 24. In the followable shafts 25 and 26 shown in FIG. 1a, the above-described contact portion "A" is composed of a projection 41 which is formed by a rotating member whose surface is spherical with respect to a rotating axis "$l_1$". A summit of this projection 41 is in contact with the steel ball 24 to rotate the shafts 25 and 26. Even if, under the abovedescribed construction, the contamination such as dust is transported from the ball 24 to the followable shafts 25 and 26, this contamination is not deposited at all on the surface of the projection 41, but is collected on both groove portions 42 beside the projection 41, because the contact portion "A" of the followable shafts 25 and 26 to the ball 24 is the projection 41, as previously explained, having the spherical surfaces, viewed in the rotating axis "$l_1$". As a result, it should be noted that the transfer of the rotation force between the ball 24, and the first and second followable shafts 25 and 26 is not hampered. Therefore, the precise X-Y position detection can be continuously achieved.

Moreover, as illustrated in FIG. 7, a resiliently biasing roller 34 is positioned at a position opposite to the first and second followable shafts 25 and 26 via the ball 24 in order that the driving force transfer can be firmly performed between the ball 24 and the first followable shaft 25, and between the ball 24 and the second followable shaft 26. This biasing roller 34 can be freely rotated by means of the rotating force of the ball 24, and also can resiliently bias the ball 24 toward the first followable shaft 25 and the second followable shaft 26.

As illustrated in FIG. 6, a mounting portion 35 downwardly projects from the position at the inner surface of the upper case 10, opposite to the ball 24. A cleaning member 36 made of felt for cleaning the ball 24 is mounted on this mounting portion 35 by utilizing adhesive resin and other appropriate means. It should be noted that this cleaning member 36 may be manufactured by either sponge or thick nonwoven fabric.

When the X-Y input apparatus 4 with the above arrangement is in the operation mode, the input apparatus 4 is manually held on the sheet 5 (referred to FIG. 2) to be moved in an arbitrary direction, with the result that the steel ball 24 can be rotated on the sheet 5 by the friction force caused by the sheet 5 and its weight. The rotation force exerted from the ball 24 is transferred to the first followable shaft 25 and the second followable shaft 26, respectively. Then, the rotation angles of the respective first and second followable shafts 25 and 26 are detected as electronic signals by the variable resistors 29 and 31 mounted thereto. The detected signals are input via the signal line 17 to a display controller, and then, processed so as to move a cursor 7 displayed on a screen 6 in the desired direction.

While the X-Y input apparatus 4 is moved on the specific sheet 5, or other planes, if the contamination such as dust, oil, water, ink and drinking water is attached on these bases (the sheet 5, or other planes), this contamination is directly attached with the ball 24. Then, even when the contamination thus attached on the ball 24 is transported to the first and second followable shafts 25 and 26, while these followable shafts are rotated by the ball 24, the contamination transported to the followable shafts 25 and 26 is no longer collected on these shafts, but collected on the both sides of the grooves 42 of the shafts 25 and 26. Accordingly, since the contamination is not collected on the surface of the contact portion "A", there is no change in the contact condition of both members, so that the precise X-Y position detection can be achieved.

Figure 1B:
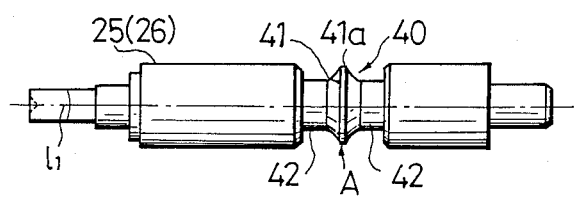
Figure 1C:
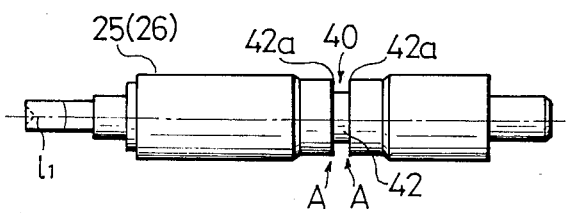

It should be noted that the projection 41 of the above-described followable shafts 25 and 26 may be formed by a rotating member whose sectional form is a trapezoid as illustrated in FIG. 1b. In this case, although the surface formed by the upper edge of the trapezoid is parallel to the rotating axis, in other words, is formed in a cylinder, and thus the contact area between the ball 24 and the surface 41a of the projection 40 becomes slightly large, this contact area cannot allow the contamination to be collected thereon, but the contamination is collected on the groove sides 42. As a result, deterioration in the detection precision due to the collection of the contamination can be avoided.

As another preferred embodiment of the steppedportion 40, a groove 42 is formed all around the circles of the first and second followable shafts 25 and 26, and a corner 42a of the groove 42 is in contact with the ball 24. In this case, the contamination which has attached to the ball 24 and thereafter transferred to the first and second followable shafts 25 and 26, is deposited within this groove 24, but not deposited on the above-described corner 42a. As a result, good contact conditions can be maintained between this corner 42a and the ball 24, which causes no deterioration in the position detecting precision.

Figure 1D:
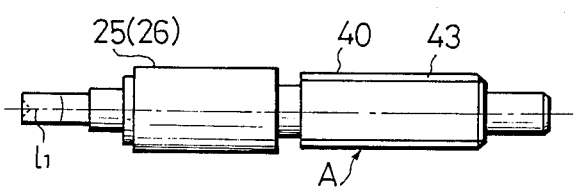

As a further preferred embodiment of the steppedportion 40, screw threads 43 are formed, as shown in FIG. 1d, adjacent to the contacting portion "A" so as to enable thread crests of the screw threads 43 to be incontact with the ball 24. In this case, a specific care is taken to the fact that the pitch of the screw threads 43 is sufficiently made small, so that no error occurs when the ball 24 travels over the screw threads 43. As a result, the contamination which has been transferred from the ball 24 to the followable shafts 25 and 26, is collected to each screw groove ajoining the screw threads 43, and is no longer deposited on the thread creasts of the screw threads 43, i.e., the contacting portion between the ball 24 and it. Consequently, as same as in the previous preferred embodiments, there is no deterioration in the detecting precision, or misoperation due to the deposited contamination.

As has been described in detail, the steppedportion is formed around the circles of the rotating members ajacent to the contacting portion with the ball to be rotated by the rotating members according to the present invention. Since no contamination is deposited on this contacting portion, there is no danger to cause the deterioration in the detection precision due to the deposition of the contamination.

What is claimed is:

1. An X-Y input apparatus comprising: a ball freely rotatably arranged;
   a first rotating shaft, having a large diameter portion and having a first contact portion, rotated by a rotating force caused by said first contact portion being in contact with said rotatable ball, said first contact portion having a diameter larger than the portions of said first rotating shaft adjacent thereto and having a diameter smaller than said large diameter portion and said first contact portion further having a first stepped portion connecting said first contact portion to said adjacent portions;
   a second rotating shaft, having a large diameter portion and having a second contact portion, having an axis of rotation substantially perpendicular to an axis of rotation of said first rotating member, and rotated by a rotating force caused by said second contact portion being in contact with said rotatable ball, said second contact portion having a diameter larger than the portions of said second rotating shaft adjacent thereto and having a diameter smaller than said large diameter portion, and said second contact portion further having a second stepped portion connecting said second contact portion to said adjacent portions;
   first rotation-angle detecting means for detecting a rotation angle of said first rotating shaft;
   second rotation-angle detecting means for detecting a rotation angle of said second rotating shaft; and
   a casing for storing said rotatable ball, first and second rotating shafts, and first and second rotation-angle detecting means therein,
   said rotatable ball partially projecting from an opening formed on a lower plane of said casing, resulting in performing X-Y input operation.

2. An X-Y input apparatus as claimed in claim 1, wherein said first and second contact portions have surfaces which are curved with respect to the rotation axis of respective said rotating shaft.

3. An X-Y input apparatus as claimed in claim I, wherein said first and second contact portions have surfaces which are formed parallel to the rotation axis of respective said rotating shaft.

4. An X-Y input apparatus as claimed in claim 1, further comprising a cleaning member mounted inside said casing and resiliently contacted to said rotatable ball.

5. An X-Y input apparatus as claimed in claim 4, wherein said cleaning member is made of sponge or nonwoven fabric.

6. An X-Y input apparatus as claimed in claim 1 further comprising a biasing roller for resiliently biasing said first and second rotating shafts via said rotatable ball.

* * * * *

UNITED STATES PATENT AND TRADEMARK OFFICE
CERTIFICATE OF CORRECTION

PATENT NO. : 4,881,065

DATED : November 14, 1989

INVENTOR(S) : Masahiro Soma and Shinya Tanaka

It is certified that error appears in the above-identified patent and that said Letters Patent is hereby corrected as shown below:

Claim 1 should read as follows:

An X-Y input apparatus comprising:

a ball freely rotatably arranged;

a first rotating shaft having a first contact portion, rotated by a rotating force caused by said first contact portion being in contact with said rotatable ball, said first contact portion having a diameter larger than the portions of said first rotating shaft adjacent thereto and further having a first stepped portion connecting said first contact portion to said adjacent portions, said first rotating shaft also having a large diameter portion which interferes with the travel of contaminants along the length of said first rotating shaft;

a second rotating shaft having a second contact portion being in contact with said rotatable ball, said second contact portion having a diameter larger than the portions of said second rotating shaft adjacent thereto and further having a second stepped portion connecting said second contact portion to said adjacent portions, said second rotating shaft also having a large diameter portion which interferes with the travel of contaminants along the length of said second rotating shaft;

first rotation-angle detecting means operatively connected with said first rotating shaft for detecting a rotation angle

UNITED STATES PATENT AND TRADEMARK OFFICE
CERTIFICATE OF CORRECTION

PATENT NO. : 4,881,065

DATED : November 14, 1989

INVENTOR(S) : Masahiro Soma and Shinya Tanaka

It is certified that error appears in the above-identified patent and that said Letters Patent is hereby corrected as shown below:

of said first rotating shaft;

second rotation-angle detecting means operatively connected with said second rotating shaft for detecting a rotation angle of said second rotating shaft; and a casing for substantially enclosing said rotatable ball, first and second rotating shafts, and first and second rotation-angle detecting means therein, said rotatable ball partially projecting from an opening defined by a plane of said casing.

Col. 6 Line 65, "Claim I" should read --claim 1--

Signed and Sealed this

Twenty-sixth Day of March, 1991

Attest:

HARRY F. MANBECK, JR.

*Attesting Officer*  *Commissioner of Patents and Trademarks*